(12) United States Patent
Park et al.

(10) Patent No.: US 12,422,191 B1
(45) Date of Patent: Sep. 23, 2025

(54) GRAPHITIZATION APPARATUS FOR MANUFACTURING ARTIFICIAL GRAPHITE USING LASER

(71) Applicants: EFC Co., LTD., Gwangyang-si (KR); Hyeongseog Park, Yeosu-si (KR); Insung Shin, Ulsan (KR); Miran Kim, Ulsan (KR); Kyeongwon Park, Yeosu-si (KR)

(72) Inventors: Hyeongseog Park, Yeosu-si (KR); Insung Shin, Ulsan (KR)

(73) Assignees: EFC Co., LTD., Gwangyang-si (KR); Hyeongseog Park, Yeosu-si (KR); Insung Shin, Ulsan (KR); Miran Kim, Ulsan (KR); Kyeongwon Park, Yeosu-si (KR)

( * ) Notice: Subject to any disclaimer, the term of this patent is extended or adjusted under 35 U.S.C. 154(b) by 0 days.

(21) Appl. No.: 19/088,980

(22) Filed: Mar. 24, 2025

(30) Foreign Application Priority Data

May 29, 2024 (KR) ........................ 10-2024-0070059

(51) Int. Cl.
*F27B 9/28* (2006.01)
*C01B 32/205* (2017.01)
(Continued)

(52) U.S. Cl.
CPC ............ *F27B 9/028* (2013.01); *C01B 32/205* (2017.08); *F27B 9/047* (2013.01); *F27B 9/3005* (2013.01);
(Continued)

(58) Field of Classification Search
CPC ........ F27B 9/028; F27B 9/047; F27B 9/3005; F27B 9/38; F27B 2009/382; F27B 9/28; F27B 9/30; F27B 9/062; F27D 5/0012; F27D 11/12; F27D 21/0035; F27D 2003/0002; F27D 2003/0006; F27D 19/00;
(Continued)

(56) References Cited

U.S. PATENT DOCUMENTS 3,699,210 A * 10/1972 Binning ................... D01F 9/32
204/157.41
4,115,280 A * 9/1978 Pratt, Jr. ................... A61L 2/08
422/186.1
(Continued)

FOREIGN PATENT DOCUMENTS

KR 10-1482655 B1 1/2015
KR 10-2325009 B1 11/2021
(Continued)

*Primary Examiner* — Xiuyu Tai
(74) *Attorney, Agent, or Firm* — Harvest IP Law LLP (57) ABSTRACT

The present disclosure relates to a graphitization apparatus for manufacturing artificial graphite using lasers, including: a first chamber having doors located on both walls thereof in such a way as to be open when saggars go in and out and providing a workspace for graphitization of raw materials filled in the saggars; a laser heater consisting of a plurality of laser systems and irradiating laser beams onto the raw materials introduced into the first chamber to graphitize the raw materials; and a first transfer conveyor for sending the saggars filled with the raw materials to the first chamber and taking the saggars out of the first camber after the graphitization has been completed.

12 Claims, 5 Drawing Sheets

(51) Int. Cl.
*F27B 9/02* (2006.01)
*F27B 9/04* (2006.01)
*F27B 9/30* (2006.01)
*F27B 9/38* (2006.01)
*F27D 5/00* (2006.01)
*F27D 11/12* (2006.01)
*F27D 21/00* (2006.01)
*F27D 3/00* (2006.01)

(52) U.S. Cl.
CPC .............. *F27B 9/38* (2013.01); *F27D 5/0012* (2013.01); *F27D 11/12* (2013.01); *F27D 21/0035* (2013.01); *F27B 2009/382* (2013.01); *F27D 2003/0002* (2013.01); *F27D 2003/0006* (2013.01)

(58) Field of Classification Search
CPC ....... F27D 2021/026; F27D 2019/0003; F27D 21/02; G01N 25/4826; G01N 33/365; D01F 9/32; D01F 9/328; D01F 9/22; D01F 9/30; D06M 11/34; D06M 2101/28; D02J 13/001; A61L 2/08; B01J 19/121; A23B 2/50; Y10S 264/19
See application file for complete search history.

(56) References Cited

U.S. PATENT DOCUMENTS

2020/0381732 A1   12/2020  Wagner et al.
2025/0012005 A1*  1/2025   Wölki ................ G01N 25/4826

FOREIGN PATENT DOCUMENTS

| KR | 10-2325756 B1 | 11/2021 |
| KR | 10-2599806 B1 | 11/2023 |

\* cited by examiner

GRAPHITIZATION APPARATUS FOR MANUFACTURING ARTIFICIAL GRAPHITE USING LASER

CROSS REFERENCE TO RELATED APPLICATION OF THE DISCLOSURE

The present application claims the benefit from Korean Patent Application No. 10-2024-0070059, filed on May 29, 2024, in the Korean Patent Intellectual Property Office, the disclosure of which is hereby incorporated by reference in their entireties.

BACKGROUND OF THE DISCLOSURE

Field of the Disclosure

The present disclosure relates to a graphitization apparatus for manufacturing artificial graphite using lasers, more specifically to a graphitization apparatus for manufacturing artificial graphite using lasers that is capable of allowing mixtures (hereinafter, referred to as "raw materials") in the form of powder of all materials usable to produce artificial graphite to be filled in tray-shaped saggars, applying high temperatures generated from the lasers to the raw materials, and graphitizing the raw materials.

Background of the Related Art

Artificial graphite is used in a wide range of applications, including anode materials of secondary batteries, electrodes for electrodes for iron making and steel making, electric discharge machining, nuclear fusion reactors, semiconductors, solar cells, and the like.

Artificial graphite disadvantageously has a lower degree of graphitization than natural graphite and a relatively high price due to a manufacturing cost thereof, but advantageously has a substantially longer lifespan than natural graphite, thereby being increasing in demand day by day.

The following patent literature 1 relates to a continuous type graphitization apparatus that includes a crucible transfer unit for transferring crucibles in which materials for graphitization are charged along a set transfer path and an induction heating unit for performing induction heating for the crucibles transferred through the crucible transfer unit in at least one induction heating chamber so that the materials for graphitization are graphitized.

Further, the following patent literature 2 relates to a graphitization apparatus that includes a charging unit for charging and mixing materials for graphitization and an induction heating unit located under the charging unit to heat and graphitize the materials for graphitization, wherein the induction heating unit has a plurality of induction heating furnaces arranged close to one another.

To ensure a high degree of competitiveness in a field of producing artificial graphite gradually increasing in demand, the present inventors have made many studies to develop a technology in which heating using existing electric furnaces is not adopted, and as a result, they have found that a high temperature greater than 2400° C., which is needed to make artificial graphite, is obtained through laser irradiation, thereby suggesting a graphitization apparatus for manufacturing artificial graphite using lasers according to the present disclosure.

RELATED ART LITERATURE

Patent Literature (Patent literature 1) KR 10-2325009 B1 (Nov. 5, 2021)
(Patent literature 2) KR 10-2325756 B1 (Nov. 8, 2021)

SUMMARY OF THE DISCLOSURE

Accordingly, the present disclosure has been made in view of the above-mentioned problems occurring in the related art, and it is an object of the present disclosure to provide a graphitization apparatus for manufacturing artificial graphite using lasers that is capable of performing graphitization for a large quantity of materials quickly through laser beams, thereby making artificial graphite.

To accomplish the above-mentioned objects, according to the present disclosure, there is provided a graphitization apparatus for manufacturing artificial graphite using lasers, including: a first chamber having doors located on both walls thereof in such a way as to be open when saggars go in and out and providing a workspace for graphitization of raw materials filled in the saggars; a laser heater consisting of a plurality of laser systems and irradiating laser beams onto the raw materials introduced into the first chamber to graphitize the raw materials; and a first transfer conveyor for sending the saggars filled with the raw materials to the first chamber and taking the saggars out of the first camber after the graphitization has been completed.

According to the present disclosure, desirably, each laser system may include a laser oscillator and a laser scanner or a first dedicated laser head connected to the laser oscillator by means of an optical fiber and having an optical lens, and the first chamber is multi-layered so that a plurality of through holes are formed on a boundary layer between upper and lower portions of the first chamber in such a way as to locate the laser scanners or the first dedicated laser heads in an upper space of the first chamber.

According to the present disclosure, desirably, the laser oscillator may be either a continuous wave (CW) type of laser oscillator having output performance between 100 W and 100 KW or a pulse type of laser oscillator having output performance between 10 W and 50 KW.

According to the present disclosure, desirably, the laser scanner may be fixedly located and operate the optical lens so that point, line, and surface light sources move on the top of the corresponding saggar at a high speed.

According to the present disclosure, desirably, the first dedicated laser head may make use of a surface light source and be movable in a three-axis direction.

According to the present disclosure, desirably, the graphitization apparatus may further include an optical lens protection cover detachably mounted on the underside of each laser scanner or each first dedicated laser head.

According to the present disclosure, desirably, the graphitization apparatus may further include an automatic cover feeder for feeding new optical lens protection covers to the undersides of the laser scanners or the first dedicated laser heads to replace existing optical lens protection covers with the new optical lens protection covers if the existing optical lens protection covers have given degrees of contamination.

According to the present disclosure, desirably, the automatic cover feeder may include: a first container in which the new optical lens protection covers are stacked; a second container in which the existing optical lens protection covers for disposal are stored; a lift located in a lower portion of the first container to lift up the new optical lens protection covers sequentially; a pusher located in an upper portion of the first container to push the new optical lens protection covers toward the undersides of the laser scanners or the first dedicated laser heads; and a transmittance detection sensor located close to a position where the optical lens protection cover of the laser scanner or the first dedicated laser head is mounted.

According to the present disclosure, desirably, the graphitization apparatus may further include a plurality of injection nozzles located around the through holes inside the first chamber to inject inert gas.

According to the present disclosure, desirably, the graphitization apparatus may further include a pre-processing part adapted to heat the raw materials before the graphitization of the raw materials and to thus remove water and volatile impurities from the raw materials.

According to the present disclosure, desirably, the pre-processing part may include: a second chamber having the shape of a closed box, while having doors located on both walls thereof; a heating furnace located above the second chamber; a raw material feeding hopper located just above the heating furnace; a valve adapted to discharge the raw materials by fixed quantity and connected to the heating furnace; and a second transfer conveyor for sending the saggars empty to the second chamber and taking the saggars filled with the raw materials out of the second chamber.

According to the present disclosure, desirably, the pre-processing part may further include: a load cell located on the underside of the second transfer conveyor just below the valve; a power base for elevating the load cell; and a vibrator located close to the load cell on the underside of the second transfer conveyor.

According to the present disclosure, desirably, the graphitization apparatus may further include a post-processing part adapted to perform quality stabilization and enhancement of artificial graphite produced through the graphitization in the laser heater, the post-processing part including: a third chamber; a plurality of laser parts located inside the third chamber; and a third transfer conveyor for sending and taking the saggars, wherein each laser part having a laser oscillator and a second dedicated laser head having an optical lens in such a way as to be connected to the laser oscillator by means of an optical fiber and make use of a surface light source.

According to the present disclosure, desirably, the graphitization apparatus may further include an optical lens protection cover detachably mounted on the underside of each second dedicated laser head and an automatic cover feeder for feeding new optical lens protection covers to the undersides of the second dedicated laser heads to replace existing optical lens protection covers with the new optical lens protection covers if the existing optical lens protection covers have given degrees of contamination.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION OF THE PREFERRED EMBODIMENTS

Hereinafter, an embodiment of the present disclosure will be explained in detail with reference to the attached drawings.

Figure 1:
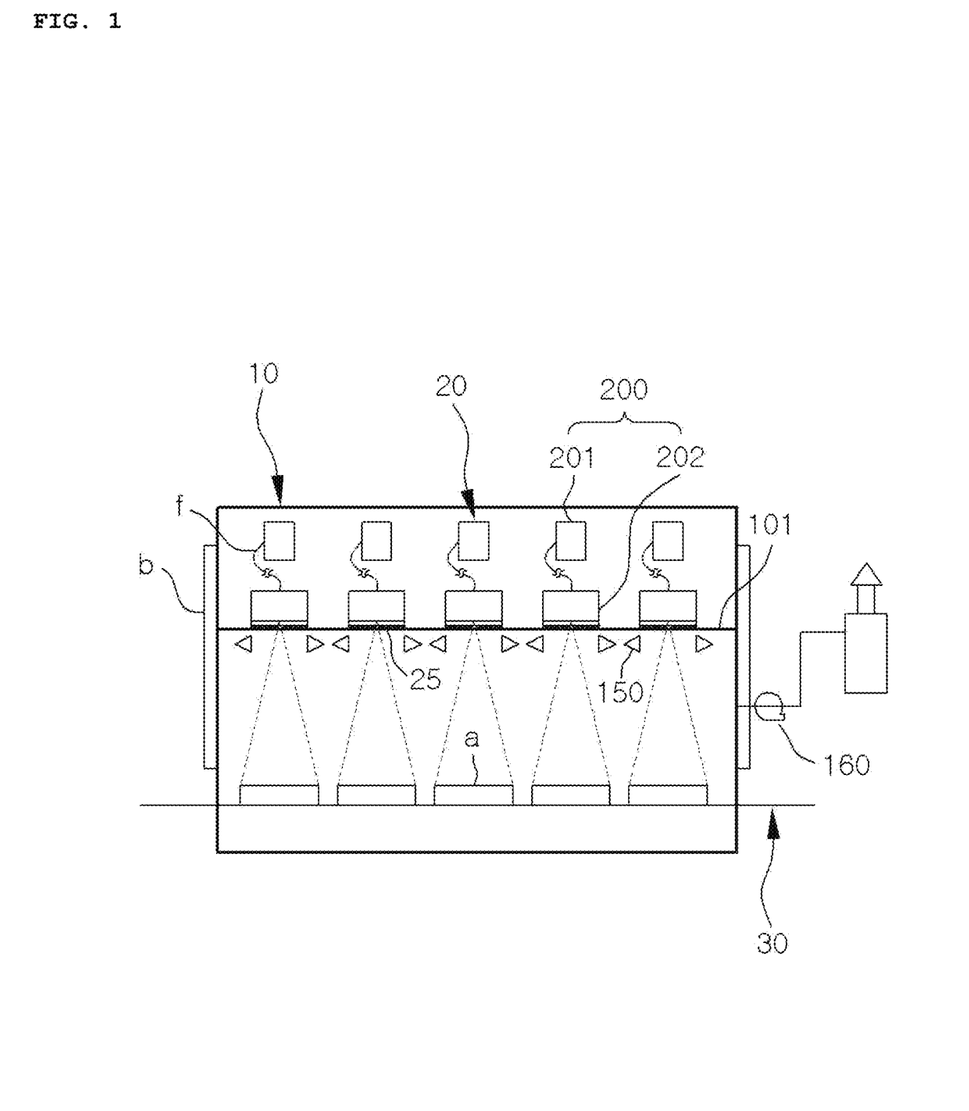
FIG. 1 is a side view showing a configuration of a graphitization apparatus for manufacturing artificial graphite using lasers according to the present disclosure.
Figure 2:
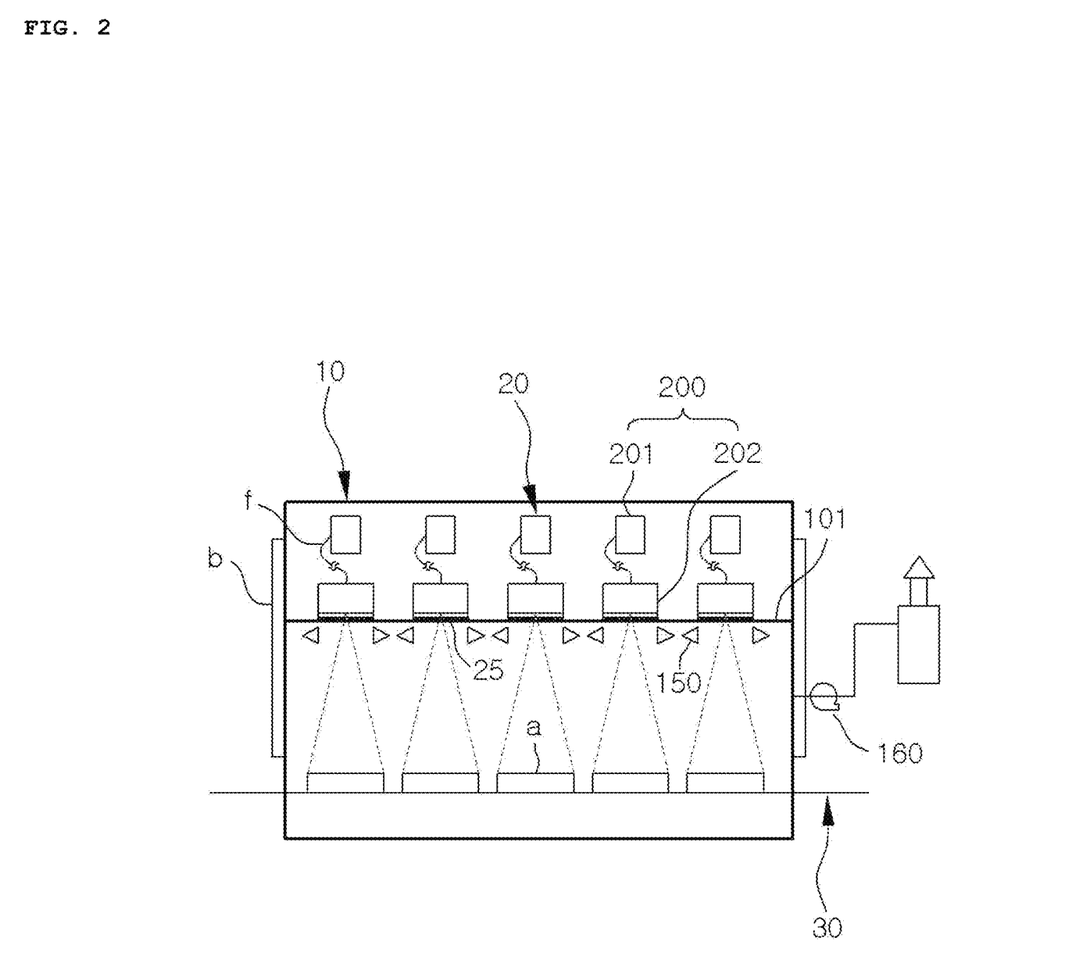
FIG. 2 is a side view showing a configuration wherein laser systems are provided with dedicated laser heads in the graphitization apparatus for manufacturing artificial graphite using lasers according to the present disclosure.
Figure 3:
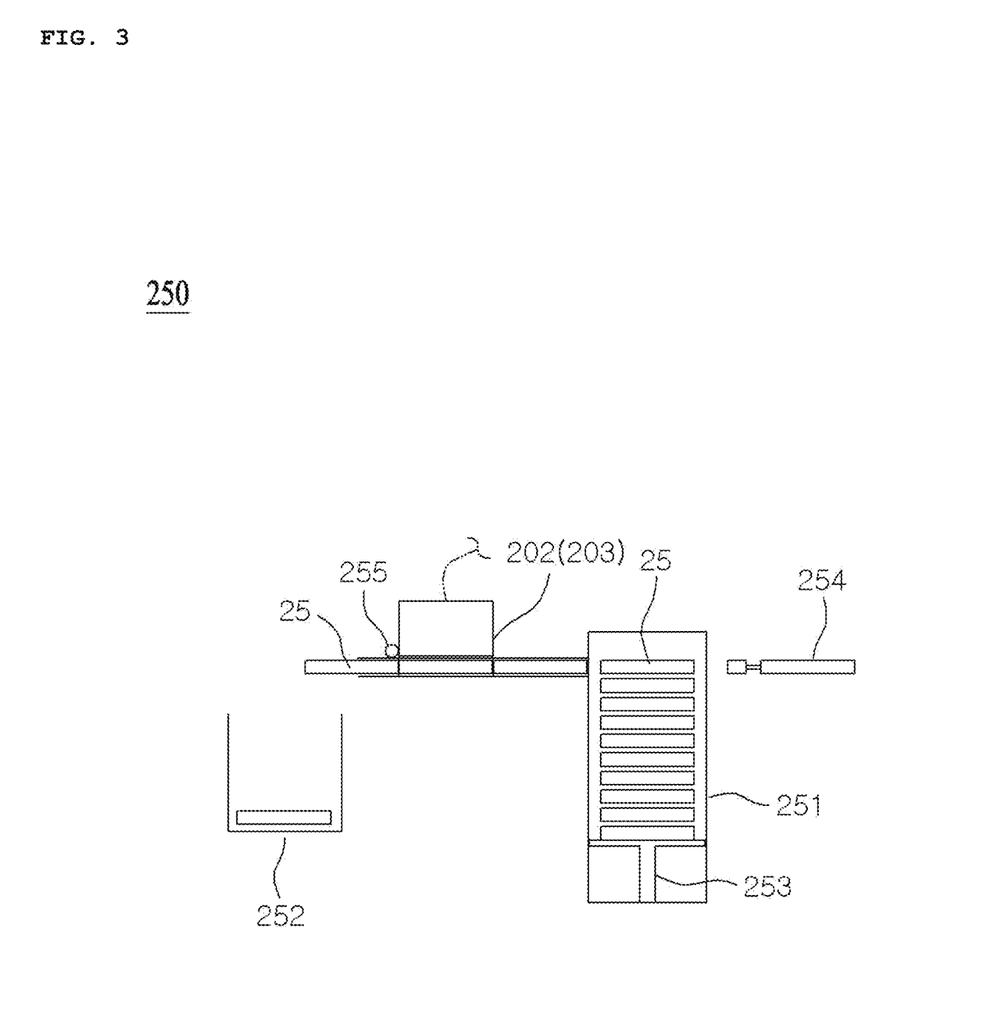
FIG. 3 is a schematic side view showing an automatic cover feeder in the graphitization apparatus for manufacturing graphite using lasers artificial according to the present disclosure.

Referring to FIGS. 1 to 3, a graphitization apparatus for manufacturing artificial graphite using lasers according to an embodiment of the present disclosure includes a first chamber 10 for providing a workspace in which graphitization of raw materials is performed, a laser heater 20 for irradiating laser beams onto the raw materials introduced into the first chamber 10 to graphitize the raw materials, and a first transfer conveyor 30 for transferring saggars a filled with the raw materials.

Now, the above-mentioned respective parts of the graphitization apparatus for manufacturing artificial graphite using lasers according to the embodiment of the present disclosure will be explained in detail.

The first chamber 10 has the shape of a closed box capable of preventing heat or various types of dust generated during work from leaking to the outside, while being multi-layered.

Further, the first chamber 10 has doors b located on both walls thereof in such a way as to be open only when the saggars a go in and out.

The laser heater 20 consists of a plurality of laser systems 200 located inside the first chamber 10 in such a way as to be alignedly arranged just above the first transfer conveyor 30.

Each laser system 200 serves to irradiate laser beams onto a top of the corresponding saggar a introduced into the first chamber 10, the saggar a being filled with the raw materials, to heat the raw materials in the saggar a to a temperature between about 2400 and 3500° C. for a predetermined time, and to graphitize the raw materials, and to do this, the laser system 200 consists of a laser oscillator 201 and a laser scanner 202 or a first dedicated laser head 203 connected to the laser oscillator 201 by means of an optical fiber f and having an optical lens.

The laser oscillator 201 is either a continuous wave (CW) type of laser oscillator having output performance between 100 W and 100 KW or a pulse type of laser oscillator having output performance between 10 W and 50 KW.

Further, the laser oscillator 201 is connected to the laser scanner 202 or the first dedicated laser head 203 by means of the optical fiber f, and if necessary in design, the laser oscillator 201 may be located in a given space on the outside of the first chamber 10.

The laser scanner 202 is fixedly located and operates the optical lens so that point, line, and surface light sources move on the top of the corresponding saggar a at a high speed.

Further, the laser scanner 202 adjusts heights of laser beams by using a 3D scanner to allow the laser beams to penetrate into the bottom of the saggar a, and the moving speeds of the laser beams are desirably in the range between 1 mm/s and 10 m/s.

The first dedicated laser head 203 makes use of a surface light source and is movable in a three-axis direction.

That is, the first dedicated laser head 203 is adjusted in height in such a way as to allow the laser beams to penetrate into the bottom of the corresponding saggar a, and next, while the first dedicated laser head 203 is moving above the corresponding saggar a, it irradiates the laser beams onto the entire top of the corresponding saggar a.

In this case, the first dedicated laser head 203 is movable by means of a linear motion (LM) guide and a servo motor.

To enhance production efficiency of products, the plurality of laser systems 200 (In the drawings, five laser systems 200 are shown, but the number of laser systems 200 may be freely determined, without being limited thereby) are located in a line just above the first transfer conveyor 30, so that the plurality of saggars a are heated simultaneously.

That is, the saggars a having the corresponding number of the laser scanners 202 among the plurality of saggars a filled with the raw materials are introduced into the first chamber 10, simultaneously and are then heated, together.

Further, fumes, which are tiny particles of dust as oxides of the raw materials, float in the first chamber 10 in the process of heating the raw materials. In this case, some of the fumes are attached to the walls of the first chamber 10. To prevent the fumes from being attached to the laser scanners 202 or the first dedicated laser heads 203, in this case, the first chamber 10 is made as a multi-layered structure.

Further, the laser scanners 202 or the first dedicated laser heads 203 are located in an upper space of the first chamber 10, and to do this, a plurality of through holes are formed on a boundary layer 101 between upper and lower portions of the first chamber 10 in such a way as to locate the laser scanners 202 or the first dedicated laser heads 203 therein. In this case, further, optical lens protection covers 25 are detachably mounted on the undersides of the laser scanners 202 or the first dedicated laser heads 203.

If the laser system 200 is provided with the first dedicated laser head 203, the first dedicated laser head 203 should be movable, and therefore, as shown in FIG. 2, the boundary layer 101 is made of a steel bellows 103.

The steel bellows 103 is located on a support frame 105 movable up and down by means of a given driving part to allow the first dedicated laser head 203 to be movable forward and backward, left and right, and up and down.

If the optical lens protection covers 25 are contaminated with the fumes, however, transmittance of laser light sources becomes low, and to solve such a problem, the graphitization apparatus according to the present disclosure further includes an automatic cover feeder 250 for feeding new optical lens protection covers 25 to the undersides of the laser scanners 202 or the first dedicated laser heads 203 to replace the existing optical lens protection covers 25 with the new optical lens protection covers 25 if the existing optical lens protection covers 25 have given degrees of contamination.

As shown in FIG. 3, the automatic cover feeder 250 includes a first container 251 in which the new optical lens protection covers 25 are stacked, a second container 252 in which the existing optical lens protection covers 25 for disposal are stored, a lift 253 located in a lower portion of the first container 251 to lift up the new optical lens protection covers 25 sequentially, a pusher 254 located in an upper portion of the first container 251 to push the new optical lens protection cover 25 toward the underside of the laser scanner 202 or the first dedicated laser head 203, and a transmittance detection sensor 255 located close to a position where the optical lens protection cover 25 of the laser scanner 202 or the first dedicated laser head 203 is mounted.

If transmittance is decreased to a given value or under due to the increase in the degree of contamination of the optical lens protection cover 25 with the fumes generated upon heating by lasers, the transmittance detection sensor 255 detects the transmittance to allow the lift 253 and the pusher 254 to operate so that the new optical lens protection covers 25 are mounted and the existing optical lens protection covers 25 are dumped in the second container 252.

If the interior of the first chamber 10 is at an inert atmosphere, further, the fumes are suppressed from being generated, and to do this, a plurality of injection nozzles 150 are located inside the first chamber 10 to inject inert gas such as argon gas. If the injection nozzles 150 are located around the through holes, the fumes can be more effectively suppressed from being attached to the optical lens protection covers 25 by means of gas injection forces.

Further, it is desirable that the fumes floating inside the first chamber 10 should be emitted to the outside as soon as possible, and to do this, a suction device 160 is additionally located on one side wall of the first chamber 10.

The first transfer conveyor 30 sends the saggars a filled with the raw materials to the first chamber 10 and then takes the saggars a out of the first chamber 10 after the graphitization has been completed.

In this case, the raw materials, which are put by fixed quantity in the corresponding saggars a as square furnaces made of graphite, are carried, and to perform efficient heating according to the characteristics of laser beams, in this case, it is desirable that top areas of the raw materials put in the saggars a are as large as possible and thicknesses of the raw materials stacked in the saggars are as thin as possible. The saggar a has the shape of a square or circular tray of a low height.

Figure 4:
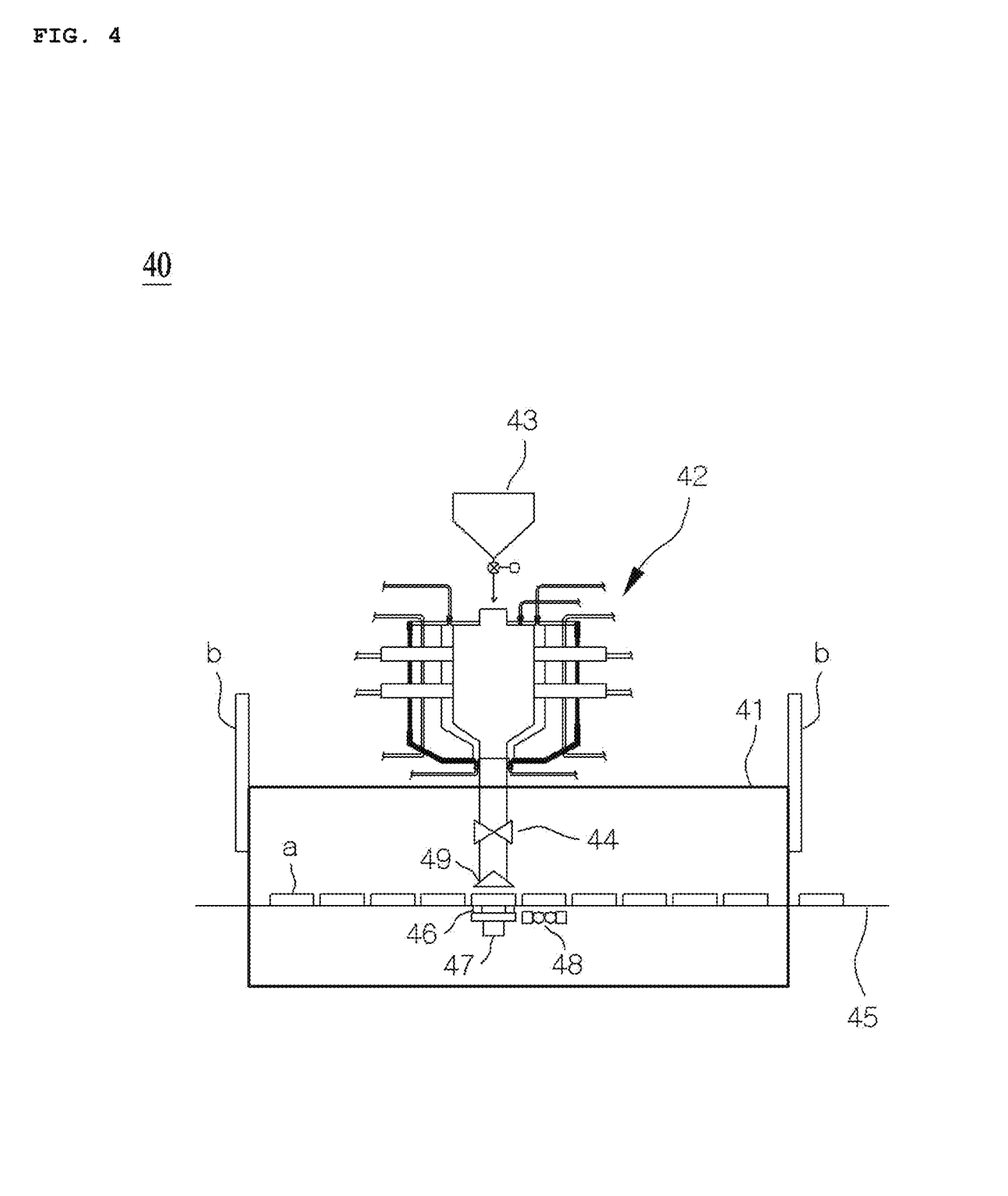
FIG. 4 is a schematic side view showing a pre-processing part of the graphitization apparatus for manufacturing artificial graphite using lasers according to the present disclosure.

Further, the graphitization apparatus according to the present disclosure includes a pre-processing part 40 adapted to heat the raw materials before the graphitization of the raw materials, to remove water and volatile impurities from the raw materials, and to perform quantitative metering and surface smoothness of the raw materials, thereby improving a graphitization efficiency.

The pre-processing part 40 includes a second chamber 41 having the shape of a closed box capable of preventing different types of dust generated during work from leaking to the outside, while having doors b located on both walls thereof, a heating furnace 42 located above the second chamber 41, a raw material feeding hopper 43 located just above the heating furnace 42, a valve 44 located inside the second chamber 41 in such a way as to be connected to the heating furnace 21 and adapted to discharge the raw materials by fixed quantity, a second transfer conveyor 45 for sending the empty saggars a to the second chamber 41 and taking the saggars a filled with the raw materials out of the second chamber 41, a load cell 46 located on the underside of the second transfer conveyor 45 just below the valve 44, a power base 47 for elevating the load cell 46, and a vibrator 48 located close to the load cell 25 on the underside of the second transfer conveyor 45.

If the graphitization apparatus according to the present disclosure is provided with the pre-processing part 40, the second transfer conveyor 45 is connected unitarily with the first transfer conveyor 30.

The heating furnace 42 serves to remove water and volatile impurities contained in the raw materials, and generally, a small electric furnace is used as the heating furnace 42. The heating furnace 42 has a raw material inlet and a raw material outlet formed on top and underside thereof and pipes connected to the outer walls thereof to discharge the water and volatile impurities to the outside.

If the interior of the heating furnace 42 is kept to a temperature between about 1000 and 1500° C. for a given time, the water and volatile impurities are vaporized from the raw materials put in the heating furnace 42, and the vaporized water and volatile impurities are exhausted to the outside through a ventilation hole formed on top of the heating furnace 42.

If the raw materials by fixed quantity are discharged from the raw material outlet of the heating furnace 42, the raw materials stored in the heating furnace 42 are pushed downward sequentially. The raw materials discharged from the raw material outlet are put in the saggar a waiting just below the valve 44, and simultaneously, the heating furnace 42 makes up for the raw materials through the hopper 43, so that the work can be continuously performed.

The load cell 46 serves to perform quantitative metering, and if the load cell 46 is lifted up by means of the power base 47, the saggar a waiting on the second transfer conveyor 45 is supported against the load cell 46, and in such a state, the raw materials are filled in the saggar a by means of the valve 44 and metered by means of the load cell 46, so that the raw materials by fixed quantity are filled in the saggar a. if the filling is completed, the load cell 46 returns to its original position by means of the power base 47.

Further, the saggar a filled with the raw materials by fixed quantity is transferred to the vibrator 48 close to the load cell 46, and through the vibrations applied from the vibrator 48, the surface smoothness of the raw materials is performed, which allows the laser beams produced in the post-process to be evenly irradiated onto the surfaces of the raw materials.

The saggars a filled with the raw materials whose surface smoothness is completed are lined up and wait around the outlet side door b of the second transfer chamber 41.

Further, the volatile impurities remaining in the raw materials may be exhausted in the process of filling the saggar a with the raw materials, and therefore, a duct 49 is located around the outlet of the valve 44 to exhaust the volatile impurities to the outside.

Figure 5:
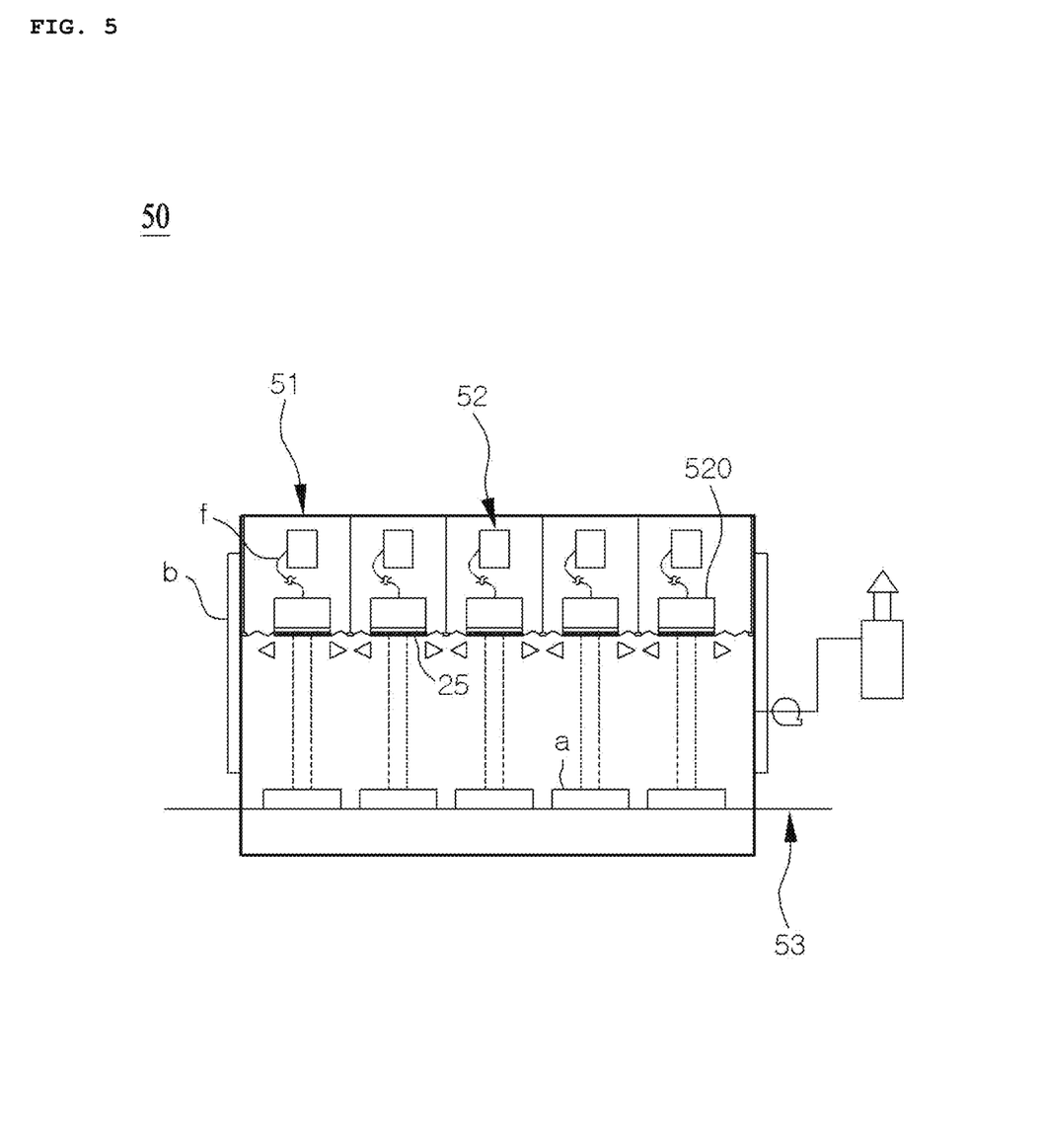
FIG. 5 is a side view showing a post-processing part of the graphitization apparatus for manufacturing artificial graphite using lasers according to the present disclosure.

Further, the graphitization apparatus according to the present disclosure includes a post-processing part 50 adapted to perform quality stabilization and enhancement (hereinafter, referred to as 'post-processing') of artificial graphite produced through the graphitization of the raw materials.

The post-processing part 50 includes a third chamber 51, a plurality of laser parts 52 located inside the third chamber 51, and a third transfer conveyor 53 for sending and taking the saggars a, and since the configuration of the post-processing part 50 is similar to that of the laser heating part 20 as mentioned above, it will be briefly explained below.

However, the configuration of the post-processing part 50 is different from that of the laser heating part 20 in that the laser parts 52 have second dedicated laser heads 520 using surface light sources with larger light widths than surface light sources of the laser scanners 202.

If the graphitization apparatus according to the present disclosure is provided with the post-processing part 50, the third transfer conveyor 53 is connected unitarily with the first transfer conveyor 30.

In the same manner as the laser heating part 20, optical lens protection covers 25 are detachably mounted on the undersides of the second dedicated laser heads 520, and further, an automatic cover feeder 250 for feeding new optical lens protection covers 25 to the undersides of the second dedicated laser heads 520 to replace the existing optical lens protection covers 25 with the new optical lens protection covers 25.

The graphitization apparatus according to the present disclosure, which is provided with the above-mentioned parts, has the following advantages, thereby ensuring high competitiveness.

First, the laser systems 200 has extremely lower power consumption for operation than the existing electric furnaces as graphitizing furnaces.

Further, consumable subsidiary materials (e.g., resistance materials, heat insulators, and carbon black) are not required, and therefore, there is no need to have large equipment (a silo or gantry robot) for storing and carrying the subsidiary materials needed in the existing graphitizing furnaces, thereby providing many advantages in building an initial facility or managing and operating the facility.

In addition, if the exiting graphitizing furnaces are decreased in temperature due to unexpected accidents, such as damages in fire bricks due to deterioration, happening during the operation at the temperature of about 3000° C., it is hard to emergently treat the unexpected accidents, but even though the laser systems 200 are mal functioned during heating, the graphitization apparatus according to the present disclosure easily replaces the malfunctioned laser systems 200 with new ones, thereby making it possible to perform emergency treatment.

Further, the graphitization apparatus according to the present disclosure performs artificial graphite production even in substantially smaller space than the spaces in existing factories, and a factory in which the graphitization apparatus according to the present disclosure is built is more eco-friendly than the existing factories. Besides, the graphitization apparatus according to the present disclosure protects workers from faulty risks and has a substantially lower production cost when compared with existing artificial graphite production costs.

As described above, the graphitization apparatus for manufacturing artificial graphite using lasers according to the present disclosure can graphitize a large quantity of raw materials quickly and stably through the plurality of laser systems, thereby having extremely lower power consumption than the artificial graphite production system using the existing electric furnaces as the graphitizing furnaces.

Further, the graphitization apparatus for manufacturing artificial graphite using lasers according to the present disclosure cannot require any consumable: subsidiary materials used in the existing graphitizing furnaces, such as resistance materials, heat insulators, and carbon black and any large equipment for storing and carrying the subsidiary materials.

Furthermore, the graphitization apparatus for manufacturing artificial graphite using lasers according to the present disclosure can make artificial graphite in a substantially smaller space when compared with spaces in existing factories and have a substantially lower production cost when compared with existing artificial graphite production costs.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A graphitization apparatus for manufacturing artificial graphite using lasers, comprising:
    a first chamber having doors located on both walls thereof in such a way as to be open when saggars go in and out and providing a workspace for graphitization of raw materials filled in the saggars;
    a laser heater consisting of a plurality of laser systems and irradiating laser beams onto the raw materials introduced into the first chamber to graphitize the raw materials; and
    a first transfer conveyor for sending the saggars filled with the raw materials to the first chamber and taking the saggars out of the first camber after the graphitization has been completed,
    wherein a laser scanner is fixedly located and operates an optical lens so that a point, a line, and a surface light sources move on the top of a corresponding saggar at a speed in a range of 1 mm/s to 10 m/s,
    wherein a first dedicated laser head makes use of the surface light source and is movable in a three-axis direction.

2. The graphitization apparatus according to claim 1, wherein each laser system comprises:
    a laser oscillator; and
    a laser scanner or a first dedicated laser head connected to the laser oscillator by means of an optical fiber and having the optical lens, and
    the first chamber is multi-layered so that a plurality of through holes are formed on a boundary layer between upper and lower portions of the first chamber in such a way as to locate the laser scanners or the first dedicated laser heads in an upper space of the first chamber.

3. The graphitization apparatus according to claim 2, wherein the laser oscillator is either a continuous wave (CW) type of laser oscillator having output performance between 100 W and 100 KW or a pulse type of laser oscillator having output performance between 10 W and 50 KW.

4. The graphitization apparatus according to claim 2, further comprising an optical lens protection cover detachably mounted on the underside of each laser scanner or each first dedicated laser head.

5. The graphitization apparatus according to claim 4, further comprising an automatic cover feeder for feeding new optical lens protection covers to the undersides of the laser scanners or the first dedicated laser heads to replace existing optical lens protection covers with the new optical lens protection covers if the existing optical lens protection covers have given degrees of contamination.

6. The graphitization apparatus according to claim 5, wherein the automatic cover feeder comprises:
    a first container in which the new optical lens protection covers are stacked;
    a second container in which the existing optical lens protection covers for disposal are stored;
    a lift located in a lower portion of the first container to lift up the new optical lens protection covers sequentially;
    a pusher located in an upper portion of the first container to push the new optical lens protection covers toward the undersides of the laser scanners or the first dedicated laser heads; and
    a transmittance detection sensor located close to a position where the optical lens protection cover of the laser scanner or the first dedicated laser head is mounted.

7. The graphitization apparatus according to claim 2, further comprising a plurality of injection nozzles located around the through holes inside the first chamber to inject inert gas.

8. The graphitization apparatus according to claim 1, further comprising a pre-processing part adapted to heat the raw materials before the graphitization of the raw materials and to thus remove water and volatile impurities from the raw materials.

9. The graphitization apparatus according to claim 8, wherein the pre-processing part comprises:
    a second chamber having the shape of a closed box, while having doors located on both walls thereof;
    a heating furnace located above the second chamber;
    a raw material feeding hopper located just above the heating furnace;
    a valve adapted to discharge the raw materials by fixed quantity and connected to the heating furnace; and
    a second transfer conveyor for sending the saggars empty to the second chamber and taking the saggars filled with the raw materials out of the second chamber.

10. The graphitization apparatus according to claim 9, wherein the pre-processing part further comprises:
    a load cell located on the underside of the second transfer conveyor just below the valve;
    a power base for elevating the load cell; and
    a vibrator located close to the load cell on the underside of the second transfer conveyor.

11. The graphitization apparatus according to claim 1, further comprising a post-processing part adapted to perform quality stabilization and enhancement of artificial graphite produced after the graphitization of the raw materials through the laser heater, the post-processing part comprising:
    a third chamber;
    a plurality of laser parts located inside the third chamber; and
    a third transfer conveyor for sending and taking the saggars, wherein each laser part having a laser oscillator and a second dedicated laser head having an optical lens in such a way as to be connected to the laser oscillator by means of an optical fiber and make use of a surface light source.

12. The graphitization apparatus according to claim 11, further comprising an optical lens protection cover detachably mounted on the underside of each second dedicated laser head and an automatic cover feeder for feeding new optical lens protection covers to the undersides of the second dedicated laser heads to replace existing optical lens protection covers with the new optical lens protection covers if the existing optical lens protection covers have given degrees of contamination.

* * * * *